May 10, 1966  F. W. GERJETS  3,250,263
APPARATUS FOR REDUCING AIR POLLUTION BY COMBUSTION ENGINES
Filed May 18, 1964  2 Sheets-Sheet 1

INVENTOR.
FRED W. GERJETS
BY Noel G. Conway
ATTORNEY

May 10, 1966   F. W. GERJETS   3,250,263
APPARATUS FOR REDUCING AIR POLLUTION BY COMBUSTION ENGINES
Filed May 18, 1964   2 Sheets-Sheet 2

INVENTOR.
FRED W. GERJETS
BY Noel J. Conway
ATTORNEY 3,250,263
APPARATUS FOR REDUCING AIR POLLUTION BY
                COMBUSTION ENGINES
    Fred W. Gerjets, 12731 S. Cambridge Ave.,
              Orange, Calif.
        Filed May 18, 1964, Ser. No. 368,073
            8 Claims. (Cl. 123—119)

This invention relates to apparatus for reducing air pollution by combustion engines, and more particularly to such apparatus which has provision for removing impurities from gases being discharged from the crankcase of an internal combustion engine.

In the operation of piston type internal combustion engines a certain amount of combustion gases escape pass the piston rings into the crankcase. Such escaped gases, often referred to as "blowby," contain water vapor, gasoline fumes, sulphur and other impurities. These gases, which are vented to the atmosphere through a crankcase breather, are considered to be a major cause of air pollution in areas where are operated large numbers of motor vehicles powered by internal combustion engines.

It has been previously determined that the air pollution of motor vehicles can be significantly reduced by conducting the blowby back to the intake side of the engine where the blowby is mixed with the incoming fuel and air, and passed through the engine. In a commonly used system the blowby is led to the air filter of the engine in front of the carburetor and to the intake manifold between the carburetor and the cylinders. This reduces air pollution, however, the acidic and partially burned substances in the blowby are corrosive to the carburetor and the engine parts thus increasing maintenance costs. Removal of the corrosive substances in the blowby prior to feeding it to the intake side of the engine reduces carburetor and engine corrosion as well as the air pollution of the auto exhaust.

Accordingly, it is a principal object of this invention to provide apparatus which can remove corrosive substances from the gaseous products of an internal combustion engine.

A further object of this invention is to provide apparatus which can condense corrosive substances out of blowby.

Another object of this invention is to provide simple, easily maintained apparatus for condensing substances out of gases, which apparatus has provision for automatically storing the condensate at a point remote from the condenser.

A still further object of this invention is to provide apparatus for condensing products out of gases, which apparatus is particularly useful in motor vehicles.

Other and further objects of this invention will become apparent in the detailed description below in conjunction with the accompanying drawings wherein.

Figure 1:
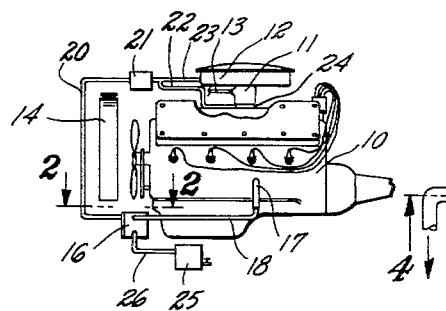
FIGURE 1 is a schematic view of an air pollution control system embodying the present invention.
Figure 2:
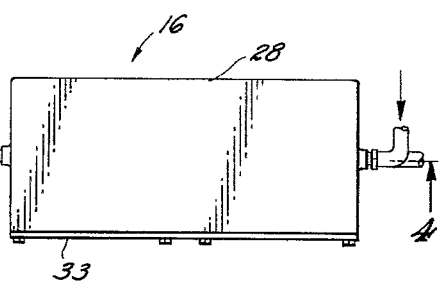
FIGURE 2 is a top view of one embodiment of a condenser which may be used in an air pollution control system of the present invention.
Figure 3:
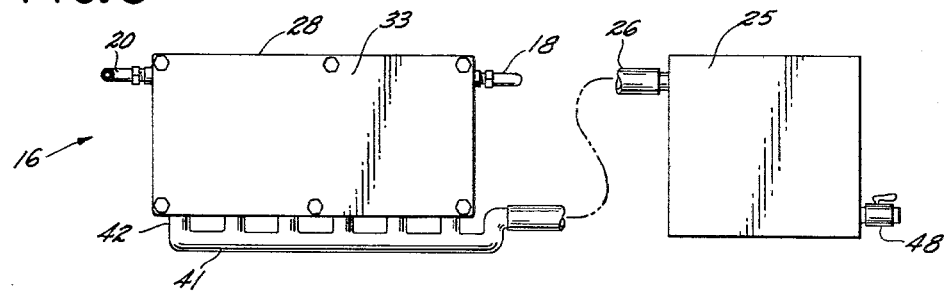
FIGURE 3 is a front view of the condenser in FIGURE 2 with the condensate storage tank.

Referring now to FIGURE 1 there is shown in schematic an internal combustion engine 10 having a carburetor 11 with an air cleaner 12 thereon. Gasoline is supplied to the carburetor 11 through a fuel line 13. Disposed in front of the engine 10 is a radiator 14.

A condenser 16 is disposed somewhat below and to the rear of the radiator 14 where the condenser is exposed to the air moving past the automobile as the automobile proceeds along the road. Blowby from the crankcase of the engine 10 is led to the condenser 16 from crankcase breather 17 through a tube 18.

After the gases have passed through the condenser 16 they are led through a tube 20 to an orifice valve 21, the purpose of which will be described below. From the orifice valve 21 the gases are led through tube 22 to intake 24 and through tube 23 to the air cleaner 12.

Since the operation of the engine 10 causes a vacuum to form at the intake 24 and air cleaner 12, the blowby is drawn from the breather 17 through the system. As will be described in greater detail below, it is desired that the gases move through the system at a controlled rate, which rate would be too high if the system was subjected to the full vacuum at the air cleaner 12 and the intake 24. For this reason, the orifice valve 21 is used to reduce the vacuum on the system upstream of the valve by greatly restricting the flow of gases through the system.

It is desirable that the condensate need not be drained from the system too often. On the other hand, the size of the condenser 16 is severely limited by the space which is available in the desired area where the condenser is exposed to the air passing around the car while the car is moving. Accordingly, I provide a storage tank 25 which is mounted on the car at a point remote from the condenser 16, which storage tank is connected to the condenser by a tube 26. As will be described in greater detail below, one important aspect of the present invention is the provision of means for automatically draining the condenser 16 into the storage tank 25.

Referring now to FIGURES 2 to 5, the preferred embodiment of the condenser 16 and the manner in which it operates will be described in greater detail. The condenser 16 includes an elongated condenser housing 28 made of aluminum or other heat conducting material. An inlet opening 29 is disposed near the upper edge of one end 30 of the condenser housing 28, and an outlet opening 31 is disposed near the upper edge of the housing's other end 32. A cover plate 33 permits access to the interior of the housing 28.

It is desired that the gases entering through the inlet 29 from the tube 18 pass through a serpentine path on their way to the outlet 31 and the tube 20. To this end, a set of spaced depending baffles 35 and a set of spaced upstanding baffles 36 are disposed within the housing as shown. As the gases pass back and forth around baffles 35 and 36, the gases lose their heat to the metal of the housing 28 and baffles, and water vapors, gasoline vapors and other impurities are condensed out of the gases.

As can be seen, consendate from the gases will collect between each pair of upstanding baffles 36 as well as in the areas between the end baffles 36 and the ends 30 and 32 of the housing 28. For this reason, a drain port 40 is provided in the bottom of the housing 28 between each pair of upstanding baffles 36 and between the end baffles 36 and the ends 30 and 32 of the housing. Disposed below the housing 28 and extending parallel to the longitudinal axis of the housing is a drain conduit 41 which communicates with all of the drain ports 40 through connecting pipes 42. At one end thereof the conduit 41 is turned upwardly to form a short stand pipe 43 so that discharge exit 44 may be located at an elevation above the level of the top of the drain conduit. Accordingly, the condensate will collect in the conduit 41, but will never rise above level 46 since further condensate will be drained through discharge exit 44 to storage tank 25.

Figure 4:
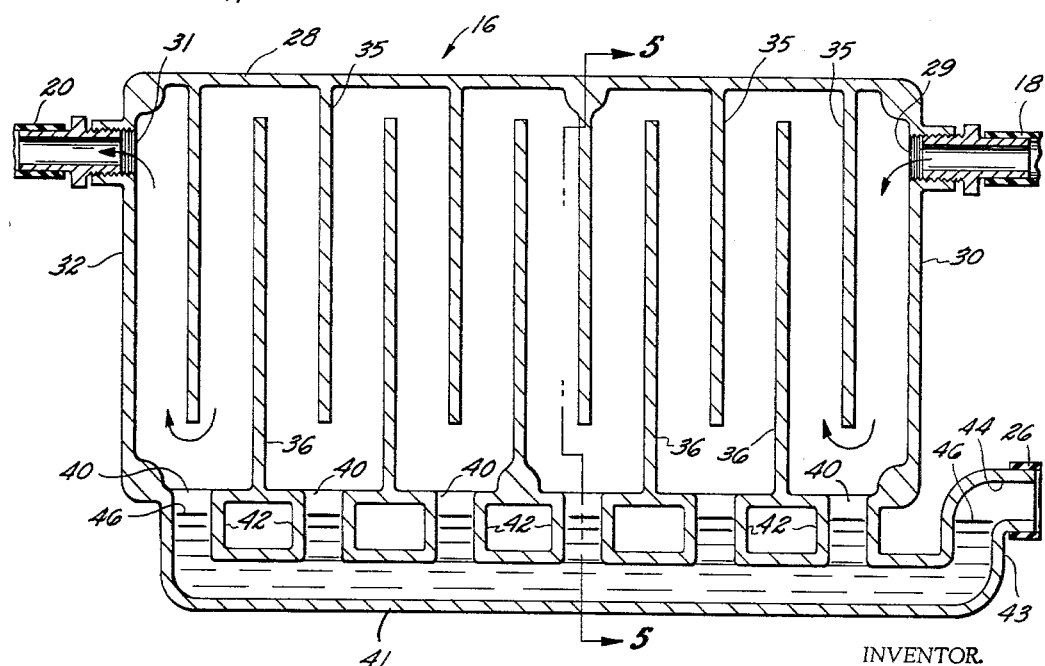
FIGURE 4 is an enlarged cross-sectional view of the condenser taken along line 4—4 in FIGURE 2.

With this arrangement, the condensate seeks the level 46 whereby the condensate functions to prevent gases from shortcutting the baffle system. That is, the condensate prevents the gases from entering through the right hand drain port 40 (as seen in FIGURE 4) to the drain conduit 41 and thence to the left hand drain port 40 (as seen in FIGURE 4) and to the outlet 31. Further, as the condensate continues to collect it is automaticaly drained to the storage tank 25 after the condensate has reached the level of the discharge exit 44. The storage tank 25 is periodically emptied through a drain valve 48.

In the preferred embodiment, the drain conduit 41 is spaced slightly below the bottom of the condenser housing 28. It should be understood that the drain conduit 41 could also be disposed with its upper side engaging the bottom of the housing 28, or actually be integral with the bottom of the housing.

The preferred manner in which I continually drain the condenser has the advantage that it is extremely economical to manufacture and is essentially maintenance free. However, if the condenser housing 28 is accelerated rapidly in one direction parallel to the axis of the drain conduit 41 the inertia on the condensate causes the condensate to move toward the opposite end of the drain conduit. For this reason, it is preferred that the condenser 16 be mounted in the automobile in the position disclosed in FIGURE 6.

Figure 6:
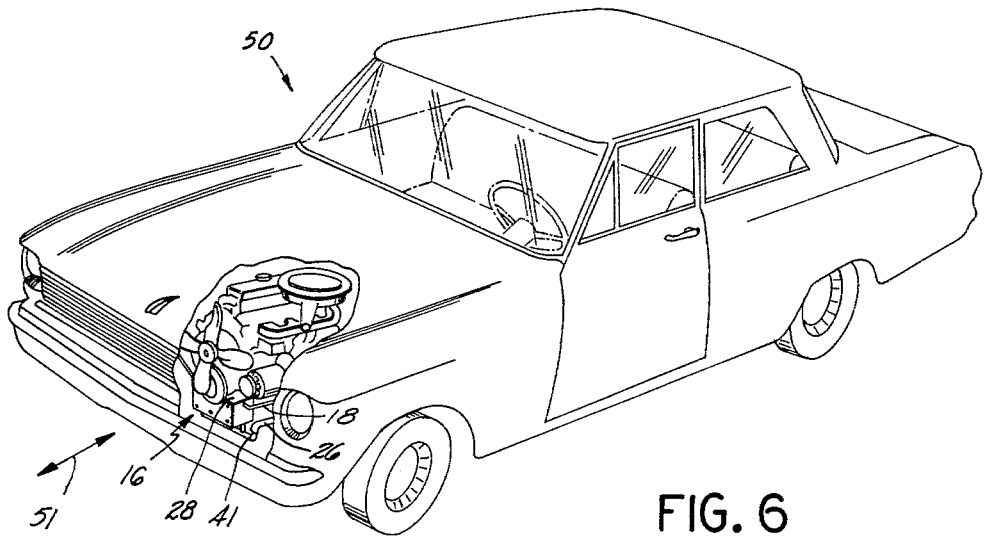
FIGURE 6 is a pictorial view of an automobile partially broken away to illustrate the preferred orientation of the condenser to the normal direction of travel of the automobile.
Figure 5:
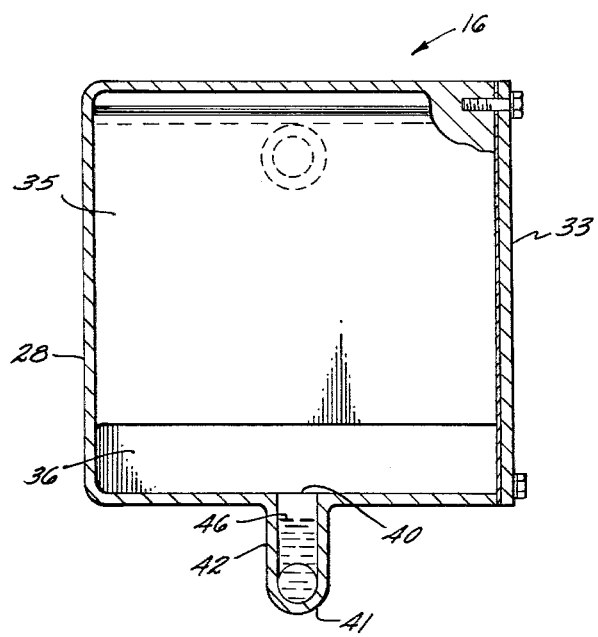
FIGURE 5 is a cross-sectional view of the condenser taken along line 5—5 in FIGURE 4.

Referring now to FIGURE 6, there is shown an automobile indicated generally by the arrow 50. The two headed arrow 51 in the figure discloses the normal direction of travel of the automobile 50. That is, the automobile normally travels forward or to the rear. Although automobile 50 will move up and down over bumps and to the left and right around corners, the acceleration forces involved are not nearly so great as when the automobile is braking or accelerating. Accordingly, it is preferred that the condenser 16 be mounted with the drain conduit 41 extending horizontally at a right angle to the normal direction of travel of the automobile.

While only a few embodiments of my invention have been shown and described in detail, it will be apparent to those skilled in the art that such is by way of illustration only and numerous changes may be made thereto without departing from the spirit of the present invention. Accordingly, it is my intention that the invention be limited solely by the scope of the appended claims.

I claim:
1. Means for removing liquids from crankcase gases, said means comprising:
   a heat exchanger housing having an inlet and an outlet;
   a plurality of spaced upstanding baffles and a plurality of spaced depending baffles positioned in said housing for causing gases moving from said inlet to said outlet to take a serpentine path;
   a plurality of drain ports in the bottom of said housing;
   a drain conduit located below said housing;
   communication means separately communicating each of said ports with said conduit;
   a discharge exit at one end of said conduit, said discharge exit being above the level of the conduit whereby condensate from said gases will collect in said conduit sufficiently to prevent gases from moving between said ports through said conduit and thereby by-pass said baffles.

2. The means for removing liquid from crankcase gases set for in claim 1 including:
   a storage tank;
   and conduit means communicating the interior of said storage tank with said discharge exit.

3. The invention set forth in claim 2 wherein valve means are provided on said storage tank for selectively emptying said tank.

4. In combination with an automobile internal combustion engine having a crankcase and an intake manifold, an air pollution reduction system comprising:
   an elongated heat exchanger housing having an inlet at one end and an outlet at the other end;
   means for carrying crankcase gases from the interior of the crankcase to said housing inlet;
   means for carrying crankcase gases from the outlet of said housing to said intake manifold;
   baffle means in said housing for causing gases to take a serpentine path from said inlet to said outlet, said baffle means including a plurality of spaced baffles upstanding from the bottom of said housing;
   a drain port located in the bottom of said housing between each of said upstanding baffles;
   a generally horizontal drain conduit extending along the bottom of said housing, said drain conduit extending at a right angle to said engine;
   means interconnecting each of said drain ports with said drain conduit at different positions thereon;
   means at one end of said conduit for allowing condensate to discharge from said conduit after the conduit is filled with condensate whereby the condensate in the conduit prevents gases in the housing from passing through the conduit and thereby by-pass the baffle means.

5. In combination with a motor vehicle having an internal combustion engine with a crankcase and an intake manifold, an air pollution reduction system comprising:
   a heat exchanger housing having an inlet and an outlet;
   means for carrying crankcase gases from the interior of the crankcase to said housing inlet;
   means for carrying gases from said housing outlet to said intake manifold;
   baffle means in said housing for causing gases to take a serpentine path from said inlet to said outlet, said baffle means including a plurality of spaced baffles upstanding from the bottom of said housing;
   a drain port located in the bottom of said housing between each of said upstanding baffles;
   a generally horizontal drain conduit extending along the bottom of said housing, said drain conduit extending at a right angle to the normal direction of travel of said motor vehicle;
   means interconnecting each of said drain ports with said drain conduit at different positions thereon and discharge control means at one end of said conduit for allowing condensate to discharge from said conconduit after the conduit is filled with condensate whereby the condensate in the conduit prevents gases in the housing from passing through the conduit and thereby by-pass the baffle means.

6. The combination set forth in claim 5 wherein said discharge control means comprises:
   a short standpipe with a discharge exit above the elevation of said conduit whereby any excess condensate over that needed to fill said conduit will be discharged through said discharge exit.

7. The combination set forth in claim 6 including:
   a storage tank;
   and means communicating the interior of said storage tank with said discharge exit.

8. The combination set forth in claim 7 wherein said storage tank is secured to said motor vehicle at a point spaced from said heat exchanger housing.

References Cited by the Examiner

UNITED STATES PATENTS

| 17,675 | 6/1857 | Hale | 55—446 X |
|---|---|---|---|
| 1,427,337 | 8/1922 | Tracy | 123—119 |

KARL J. ALBRECHT, *Primary Examiner.*